United States Patent
Robillard et al.

(10) Patent No.: US 10,518,871 B2
(45) Date of Patent: Dec. 31, 2019

(54) CROCODILE-TYPE FLIGHT CONTROL SURFACE FOR AIRCRAFT WITH LOCKING MECHANISM FOR ADDITIONAL STIFFNESS

(71) Applicant: Airbus Operations SAS, Toulouse (FR)

(72) Inventors: Jerome Robillard, L'Isle Jourdain (FR); Pierre Dourel, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 283 days.

(21) Appl. No.: 15/651,769

(22) Filed: Jul. 17, 2017

(65) Prior Publication Data
US 2018/0015998 A1   Jan. 18, 2018

(30) Foreign Application Priority Data
Jul. 18, 2016   (FR) ..................................... 16 56831

(51) Int. Cl.
*B64C 9/04* (2006.01)
*B64C 13/28* (2006.01)
*B64C 13/40* (2006.01)
*B64C 9/00* (2006.01)
*B64C 9/20* (2006.01)
*B64C 13/50* (2006.01)

(52) U.S. Cl.
CPC .............. *B64C 13/28* (2013.01); *B64C 9/00* (2013.01); *B64C 9/20* (2013.01); *B64C 13/40* (2013.01); *B64C 13/50* (2013.01)

(58) Field of Classification Search
CPC .... B64C 9/00; B64C 9/04; B64C 9/06; B64C 9/10; B64C 9/32; B64C 9/323; B64C 13/00; B64C 13/24; B64C 13/28; B64C 13/30; B64C 13/36; B64C 13/40
See application file for complete search history.

(56) References Cited

U.S. PATENT DOCUMENTS 1,974,407 A * 9/1934 Barnhart .................. B64C 5/08
                                                                    244/217
2,344,945 A * 3/1944 Knox ....................... B64C 9/32
                                                                    244/113
(Continued)

FOREIGN PATENT DOCUMENTS

WO   2007068450   6/2007

OTHER PUBLICATIONS

French Search Report, dated Feb. 13, 2017, priority document.

*Primary Examiner* — Richard R. Green
*Assistant Examiner* — Michael A. Fabula
(74) *Attorney, Agent, or Firm* — Greer, Burns & Crain, Ltd.

(57) ABSTRACT

A crocodile-type flight control surface comprising an upper foil flap, a lower foil flap, an actuating mechanism which guarantees the rotational displacement of each foil flap about a joint axis, either in the same direction or in different directions, and a locking mechanism alternatively adopting a locking position in which the upper foil flap and the lower foil flap are fixed with respect to each other and an unlocking position in which the upper foil flap and the lower foil flap are free with respect to the other. A crocodile-type flight control surface of this kind is therefore stiffened by the locking mechanism that joins the two foil flaps.

4 Claims, 4 Drawing Sheets

(56) References Cited

U.S. PATENT DOCUMENTS

| | | | | |
|---|---|---|---|---|
| 2,347,230 A | * | 4/1944 | Zuck | B64C 3/38 |
| | | | | 244/225 |
| 2,445,833 A | * | 7/1948 | Van Zelm | B64C 9/32 |
| | | | | 244/113 |
| 2,612,329 A | * | 9/1952 | Crandall | B64C 13/00 |
| | | | | 244/113 |
| 4,566,657 A | | 1/1986 | Grow | |
| 4,717,097 A | * | 1/1988 | Sepstrup | B64C 3/50 |
| | | | | 244/217 |
| 5,655,737 A | * | 8/1997 | Williams | B64C 3/50 |
| | | | | 244/212 |
| 6,079,672 A | * | 6/2000 | Lam | B64C 9/00 |
| | | | | 244/216 |
| 6,554,229 B1 | * | 4/2003 | Lam | B64C 9/00 |
| | | | | 244/217 |
| 8,613,409 B2 | * | 12/2013 | Cazals | B64C 9/323 |
| | | | | 244/213 |
| 2010/0140393 A1 | | 6/2010 | Bender | |
| 2011/0024556 A1 | * | 2/2011 | Cazals | B64C 23/076 |
| | | | | 244/99.12 |
| 2011/0135472 A1 | * | 6/2011 | Cazals | B64C 9/16 |
| | | | | 416/23 |
| 2016/0161949 A1 | | 6/2016 | Lam et al. | |

\* cited by examiner

CROCODILE-TYPE FLIGHT CONTROL SURFACE FOR AIRCRAFT WITH LOCKING MECHANISM FOR ADDITIONAL STIFFNESS

CROSS-REFERENCES TO RELATED APPLICATIONS

This application claims the benefit of the French patent application No. 1656831 filed on Jul. 18, 2016, the entire disclosures of which are incorporated herein by way of reference.

TECHNICAL FIELD

The present invention relates to a crocodile-type flight control surface for aircraft, as well as an aircraft comprising a crocodile-type flight control surface of this kind and also a method of controlling a crocodile-type flight control surface of this kind.

BACKGROUND OF THE INVENTION

A state-of-the art aircraft comprises a certain number of flight control surfaces which allow certain axes of the aircraft to be controlled. In particular, an aircraft comprises at least one crocodile-type flight control surface, in other words a flight control surface comprising two foil flaps, each one being rotationally movable. The two foil flaps are disposed one against the other and each one is rotationally controlled by an actuator. The two foil flaps can therefore be controlled independently one of the other, either in the same rotational direction or in opposing rotational directions to move one away from the other, thereby exhibiting a shape identical to that of an open crocodile mouth.

When the two foil flaps are displaced in the same direction, they behave like a one-piece aileron or a flight direction control surface and when the two foil flaps are displaced in opposing directions, they behave like an air brake.

At present, the rigidity of a crocodile-type flight control surface of this kind is guaranteed by the internal rigidity of each foil flap, which requires heavy foil flaps to be put in place.

SUMMARY OF THE INVENTION

An object of the present invention is to propose a crocodile-type flight control surface which is stiffened by a locking mechanism that allows the structure of each foil flap to be reduced.

To this end, a crocodile-type flight control surface is proposed which comprises:
an upper foil flap,
a lower foil flap,
an actuating mechanism which guarantees the rotational displacement of each foil flap about a joint axis, either in the same direction or in different directions, and
a locking mechanism alternatively adopting a locking position in which the upper foil flap and the lower foil flap are fixed one in respect of the other and an unlocking position in which the upper foil flap and the lower foil flap are free one in respect of the other.

A crocodile-type flight control surface of this kind is stiffened by the locking mechanism that joins the two foil flaps.

Advantageously, the actuating mechanism comprises:
a first actuator,
a second actuator,
an upper connecting rod fixed at one end to the upper foil flap and at another end to the first actuator and
a lower connecting rod fixed at one end to the lower foil flap and at another end to the second actuator,
the upper connecting rod and the lower connecting rod being mounted in a rotationally movable manner about the shared axis.

Advantageously, one of the connecting rods exhibits a first shaft, while the other connecting rod exhibits a second shaft which is hollow and in which is housed said first shaft, the locking mechanism comprises:
a plunger cylinder, whereof the cylinder extends the second shaft and whereof the piston extends the first shaft, defining a chamber between the bottom of the cylinder and the piston,
an energy source connected to the chamber and adapted to adopt, alternatively, a pressurized position in which it puts the chamber under pressure and tends to push back the piston from the bottom of the chamber and an unpressurized position in which it does not place the chamber under pressure,
a return travel means which prevents the piston from moving towards the bottom of the chamber
and part of the inner surface of the cylinder takes the shape of a first frustum and part of the outer surface of the piston takes the shape of a second frustum, the two frustums being arranged such that in an unpressurized position corresponding to the locking position, their lateral surfaces are in contact, preventing any movement of one in respect of the other, and such that in a pressurized position corresponding to the unlocking position, their lateral surfaces are not in contact, allowing movements of one in respect of the other.

The invention likewise proposes an aircraft comprising a structure and at least one crocodile-type flight control surface according to one of the preceding variants fixed to said structure.

The invention likewise proposes a control method of a crocodile-type flight control surface according to one of the preceding variants, said control method comprising:
a displacement stage during which the actuating mechanism displaces the two foil flaps into an angular position,
when the foil flaps have reached said angular position, an overload stage during which the actuating mechanism applies to each foil flap a force corresponding to an angular deviation tending to bring them closer and previously evaluated during a fine-tuning stage.

Advantageously, said fine-tuning stage comprising:
a clamping sub-stage during which a first foil flap is clamped in an angular reference position,
an application sub-stage during which a force is applied to the second foil flap, said forcing tending to press the second foil flap against the first foil flap,
an evaluation sub-stage during which the angular deviation of the second foil flap corresponding to the force thereby applied is evaluated,
a clamping sub-stage during which the second foil flap is clamped in the reference angular position,
an application sub-stage during which a force is applied to the first foil flap, said force tending to press the first foil flap against the second foil flap,
an evaluation sub-stage during which the angular deviation of the first foil flap corresponding to the force thereby applied is evaluated.

BRIEF DESCRIPTION OF THE DRAWINGS

The characteristics of the invention referred to above, as well as others, will become clearer on reading the following description of an exemplary embodiment, said description being provided in relation to the attached drawings, in which.

DETAILED DESCRIPTION OF THE PREFERRED EMBODIMENTS

In the following description, the flight control surface is an aileron of a wing, but the invention relates in the same way to other flight control surfaces of the aircraft, such as the depth flight control surface, the direction flight control surface or others, whereas the flight control surface can be used as an air brake.

Figure 1:
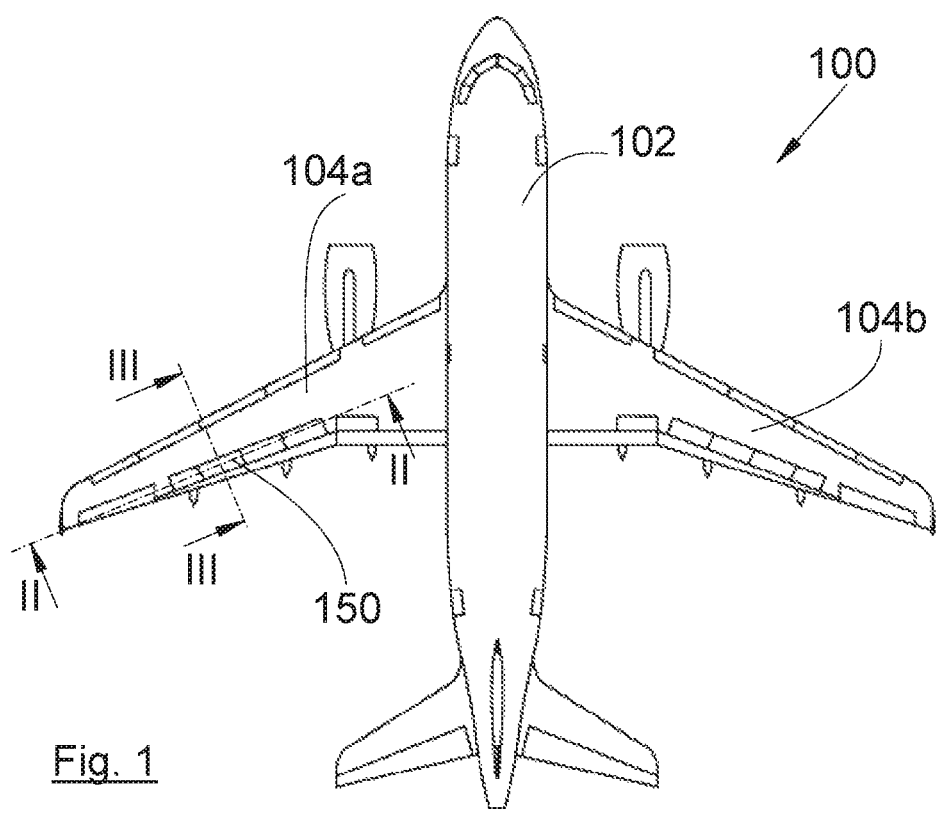
FIG. 1 shows a plan view of an aircraft comprising a flight control surface according to the invention.

FIG. 1 shows an aircraft 100 comprising a fuselage 102 and two wings 104*a-b* fixed on either side of the fuselage 102. Each wing 104*a-b* has a certain number of ailerons, at least one of which constitutes a crocodile-type flight control surface 150.

Figure 2:
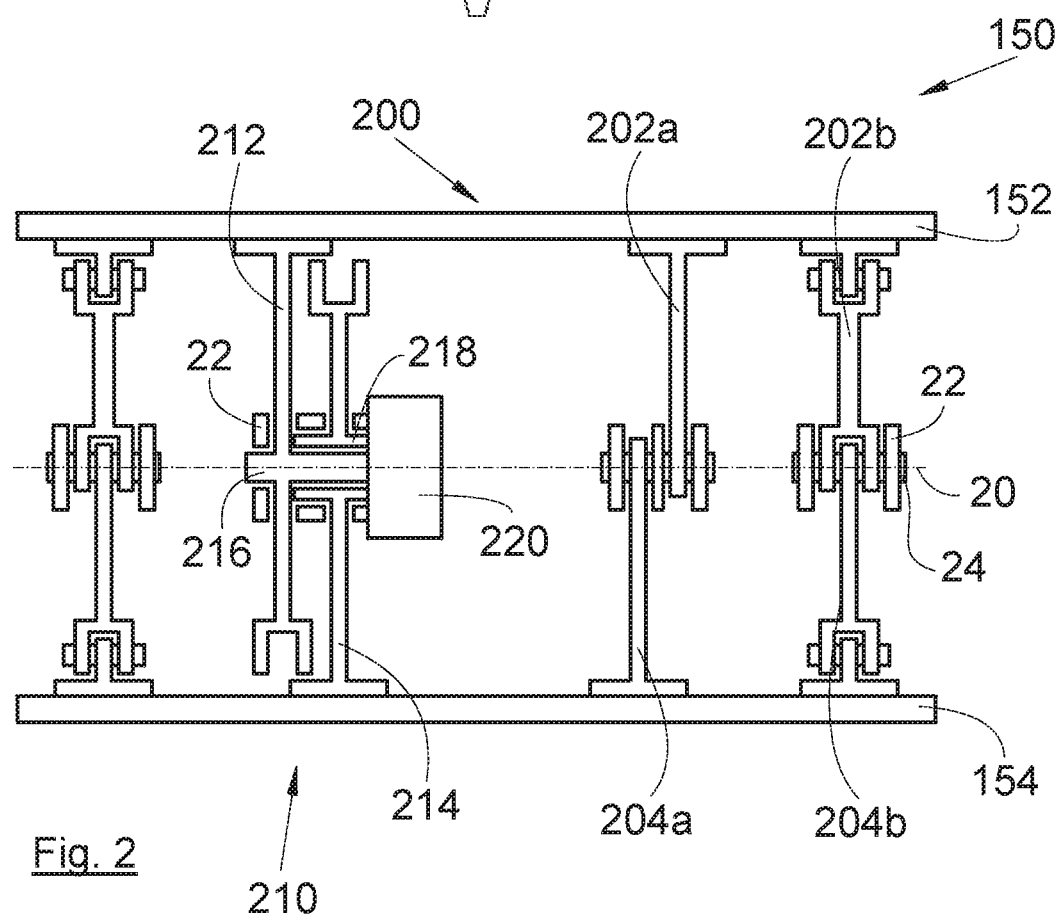
FIG. 2 shows a rear sectional view of the flight control surface according to line II-II in FIG. 1.
Figure 3:
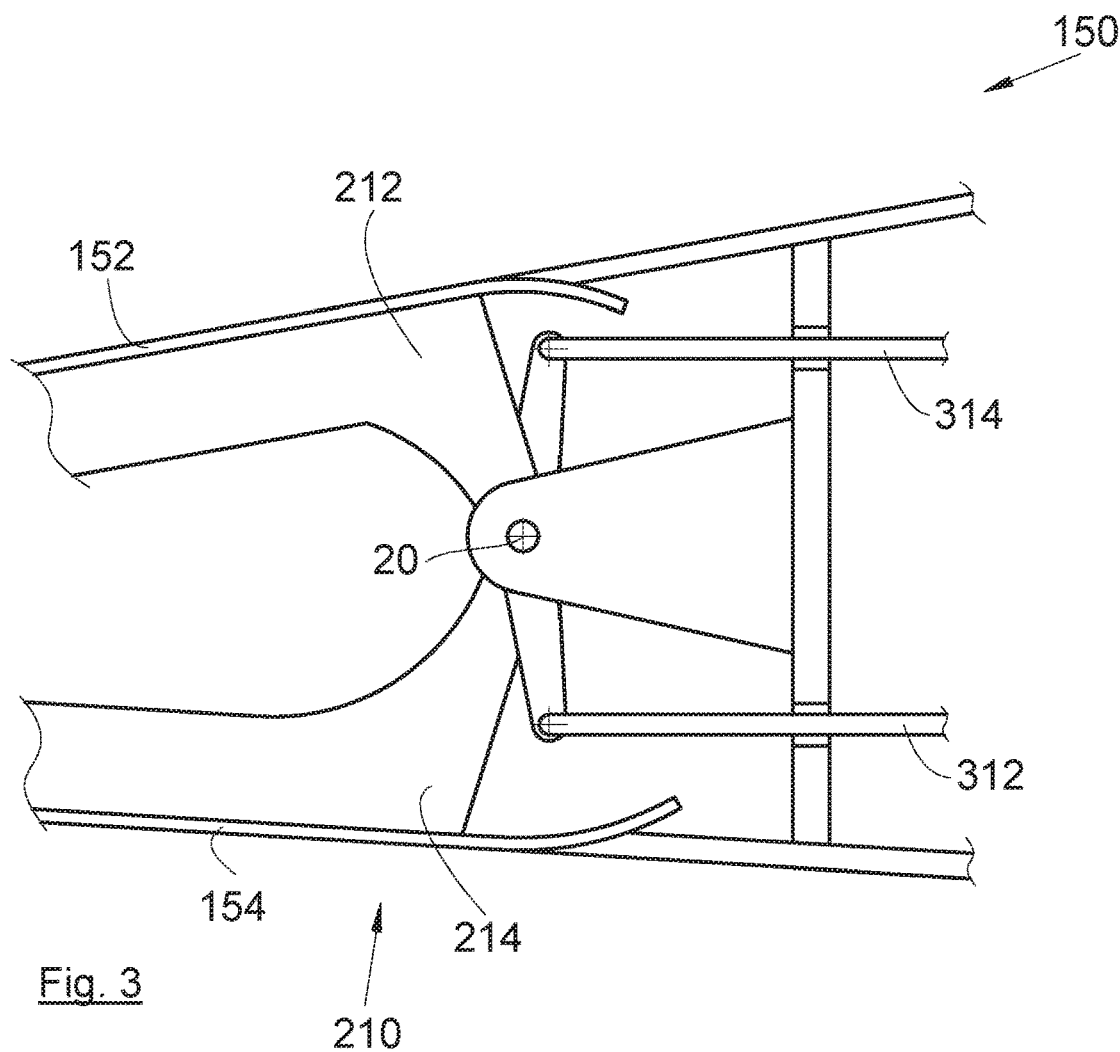
FIG. 3 shows a side sectional view of the flight control surface according to line III-III in FIG. 1.

FIG. 2 and FIG. 3 show a sectional view of the crocodile-type flight control surface 150. The crocodile-type flight control surface 150 comprises an upper foil flap 152 and a lower foil flap 154.

The crocodile-type flight control surface 150 likewise comprises an actuating mechanism 210 which guarantees the rotational displacement of each foil flap 152, 154 about a joint axis 20, either in the same rotational direction or in different directions. The rotation of each foil flap 152, 154 is performed in respect of a structure 22 of the aircraft 100 which, in the embodiment of the invention shown here, is a structure of the wing 104*a-b*. The crocodile-type flight control surface 150 is fixed to the structure 22.

The two foil flaps 152 and 154 may thereby adopt a spaced-apart position when the air brake function is activated or return to the narrowed position when the air brake function is deactivated. When the two foil flaps 152 and 154 are bonded one to the other, they pivot together in one direction or in the other.

The crocodile-type flight control surface 150 likewise comprises a locking mechanism 220 which, alternatively, adopts a locking position in which the upper foil flap 152 and the lower foil flap 154 are fixed one in respect of the other and an unlocking position in which the upper flight control surface 152 and the lower flight control surface 154 are free one in respect of the other.

The positioning of a locking mechanism 220 of this kind thereby guarantees a very high degree of rigidity in the locking position and allows freedom of movement of a foil flap 152, 154, one in respect of the other, in the unlocking position.

The control of the locking mechanism 220 is performed by any appropriate control means, such as a control unit like a processor or CPU (Central Processing Unit), for example, which itself receives orders, for example, from a navigation system of the aircraft 100.

The unlocking position thereby allows the two foil flaps 152 and 154 to be moved apart when the air brake function is activated or brought closer together when the air brake function is deactivated. The locking position allows the two foil flaps 152 and 154 to be locked, whether they are in the spaced-apart or narrowed position.

The actuating mechanism 210 comprises:
  a first actuator 312 fixed to the structure 22,
  a second actuator 314 fixed to the structure 22,
  an upper connecting rod 212 fixed at one end to the upper foil flap 152 and at another end to the first actuator 312 and
  a lower connecting rod 214 fixed at one end to the lower foil flap 154 and at another end to the second actuator 314.

The upper connecting rod 212 and the lower connecting rod 214 are, moreover, mounted on the structure 22 in a rotationally movable manner about the joint axis 20. The connecting rods 212 and 214 thereby form lever arms which pivot about the joint axis 20 when the actuators 312, 314 are actuated. According to the direction of the force exerted by the actuator 312, 314 on the connecting rod 212, 214, the corresponding foil flap 152, 154 will pivot upwards or downwards.

The link between the connecting rod 212, 214 and the associated actuator 312, 314 in this case is a pivot link about a rotational axis parallel with the joint axis 20. The link between the connecting rod 212, 214 and the associated foil flap 152, 154 is a rigid link in this case.

In the embodiment of the invention shown in FIGS. 2 and 3, and for each connecting rod 212, 214, the joint axis 20 is disposed between the two ends of said connecting rod 212, 214.

The first and second actuators 312 and 314 are preferably plunger cylinders which are electrical or hydraulic, for example, and which are controlled by the control unit. Only the movable shafts of the actuators 312 and 314 can be seen in FIG. 3.

Figure 4:
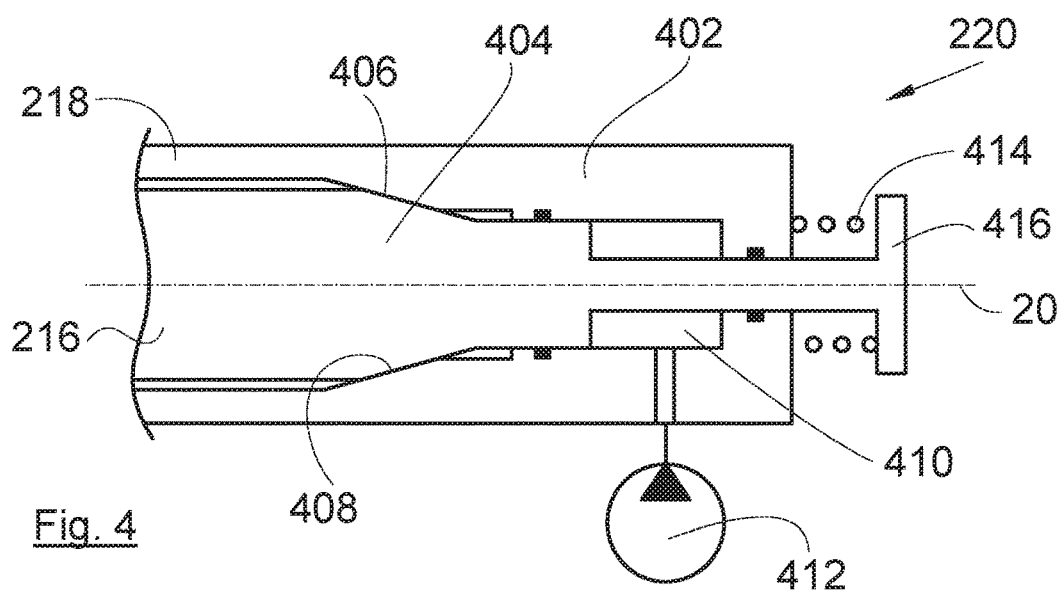
FIG. 4 shows a section through a locking mechanism.

FIG. 4 shows an enlargement of the locking mechanism 220.

The upper connecting rod 212 exhibits a first shaft 216 coaxial with the joint axis 20 and the lower connecting rod 214 exhibits a second shaft 218 which is hollow and coaxial with the joint axis 20 and into which the first shaft 216 is introduced, which shaft can turn there freely.

A reverse arrangement is of course equally possible and one of the connecting rods (212 in this case) then exhibits a first shaft (216 in this case), whereas the other connecting rod (214 in this case) exhibits a second shaft (218 in this case) which is hollow and in which said first shaft is housed.

The second shaft 218 and the first shaft 216 are mounted in a rotationally movable manner with respect to the structure 22 by way of appropriate means, such as bearings of the structure 22, for example.

The locking mechanism 220 comprises a plunger cylinder, whereof the cylinder 402 extends the second hollow shaft 218 and whereof the piston 404 extends the first shaft 216. Between the bottom of the cylinder 402 and the piston 404 is formed a chamber 410 connected fluidically to an energy source 412 of the locking mechanism 220.

In the embodiment of the invention presented in FIG. 4, the plunger cylinder is hydraulic and the energy source 412 is a pump which, on the instructions of the control unit, places oil from the chamber 410 under pressure or not.

Generally speaking, the energy source 412 alternatively adopts a pressurized position in which the energy source 412 places the fluid contained in the chamber 410 under pressure, which tends to push back the piston 404 from the bottom of the chamber 410, and an unpressurized position in which the energy source 412 does not put fluid contained in the chamber 410 under pressure.

The locking mechanism 220 likewise exhibits a return travel means 414 which prevents the piston 404 from moving towards the bottom of the chamber 410. The return travel means 414 in this case is a helical compression spring which is arranged between the outside of the bottom of the chamber 410 and an integral flange ring 416 of the piston 404.

Part of the inner surface of the cylinder 402 takes the shape of a first frustum 406 and part of the outer surface of the piston 404 takes the shape of a second frustum 408. For each frustum 406, 408, the small base is oriented towards the chamber 402 and the two frustums 406 and 408 exhibit identical angles.

The two frustums 406 and 408 are such that the second frustum 408 fits inside the first frustum 406 and the two frustums 406 are arranged so that in an unpressurized position their lateral surfaces are in contact, preventing any movement of one in respect of the other, and so that in a pressurized position their lateral surfaces are not in contact, allowing movements of one in respect of the other.

Hence, in an unpressurized position, the return travel means 414 constrains the two frustums 406 and 408 one against the other and blocks the rotation of the second shaft 218 in respect of the first shaft 216, which corresponds to the locking position of the locking mechanism 220. In a stressed position, the two frustum 406 and 408 move apart from one another and allow the second shaft 218 to rotate in respect of the first shaft 216, which corresponds to the unlocking position of the locking mechanism 220.

In order to guarantee a movement of each foil flap 152, 154 over its entire length, the crocodile-type flight control surface 150 comprises an articulation mechanism 200, allowing each foil flap 152, 154 to rotate about the common rotational axis 20 with respect to the structure 22.

In the embodiment of the invention shown in FIGS. 2 and 3, the articulation mechanism 200 comprises a plurality of upper tie-rods 202a-b for the upper foil flap 152 and a plurality of lower tie-rods 204a-b for the lower foil flap 154. Remaining with the embodiment depicted here, certain tie-rods 202a, 204a are rigidly fixed to the associated foil flap 152, 154 and others 202b, 204b are rigidly fixed to the associated foil flap 152, 154 by means of a pivot link, whereof the axis is parallel to the joint axis 20. Moreover, each tie-rod 202a-b of a foil flap 152 is fixed to a tie-rod 204a-b of the other foil flap 154 by means of a pivot link, whereof the axis is the joint axis 20.

The rotation of a pair of tie-rods 202a-b and 204a-b about the joint axis 20 is guaranteed, for example, by an assembly of bearings realized in the structure 22 and in which shafts 24 are fitted on which one end of each tie-rod 202a-b, 204a-b is likewise fitted.

While the aircraft 100 is in flight, it is desirable for the two foil flaps to remain perfectly bonded one to the other (except in air brake mode), so that the crocodile-type flight control surface 150 behaves as a single component. To achieve this, whatever the position of the crocodile-type flight control surface 150, a force must be applied to each foil flap 152, 154, in order to guarantee this contact.

Figure 5:
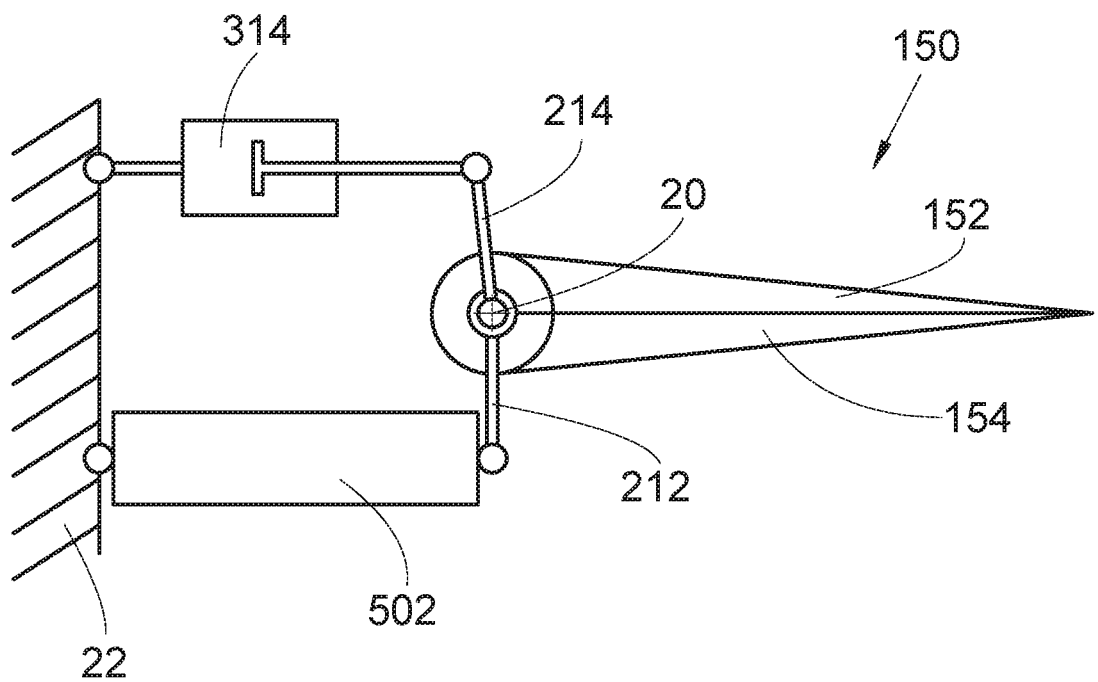
FIG. 5 shows a fine-tuning position of the flight control surface to the horizontal and FIG. 6 shows a tilted position of the flight control surface.
Figure 6:
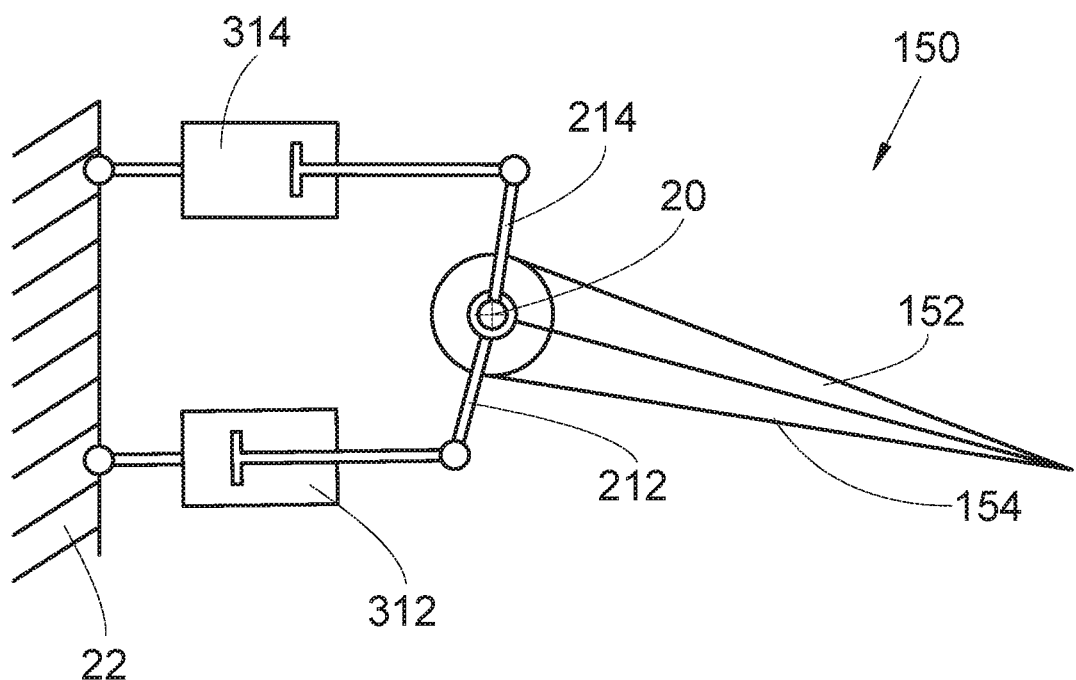
Figure 7:
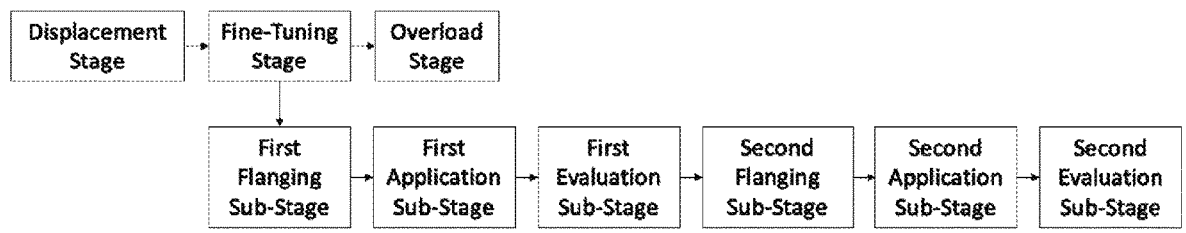
FIG. 7 is a flow chart of successive stages of a control method for a crocodile-type control surface.
Figure 8:
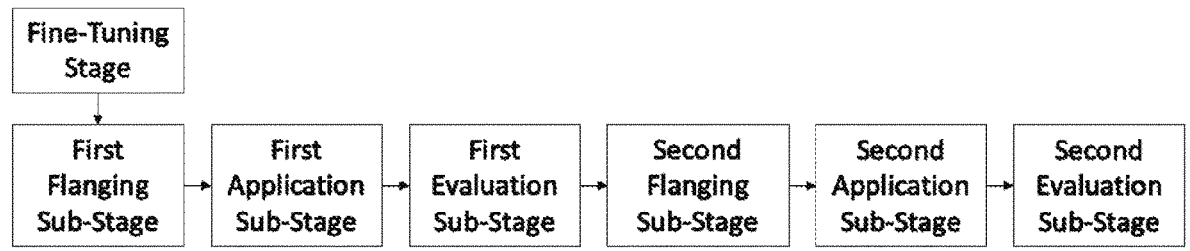
FIG. 8 is a flow chart of successive sub-steps of the fine-tuning stage of the control method of FIG. 7.

To achieve this, the force required in order to guarantee this contact must be evaluated. FIG. 5 shows a preparation phase of the crocodile-type flight control surface 150 and FIG. 6 shows a functional phase of the crocodile-type flight control surface 150.

The preparation phase involves successively replacing each actuator 312, 314 with a block 502 which prevent displacement of the foil flap 152, 154 which is associated with the missing actuator 312, 314.

In FIG. 5, the first actuator 312 is missing and the block 502 restricts the movement of the upper foil flap 152, thereby blocking the displacement of the upper connecting rod 212 in this case.

From a neutral position corresponding to an angle of θ, which is equal to 0 in this case and corresponds to the horizontal, a command is sent to the second actuator 314 in such a manner as to force the lower foil flap 154 against the upper foil flap 152. It is therefore a question of controlling a rotation of the lower foil flap 154, which tends to increase its angle in respect of the angle of the neutral position. The control applied tends to displace the lower foil flap 154 by an angle $\theta+\delta\theta_{inf}$, in which $\delta\theta_{inf}$ is counted positively in the upwards direction of the lower foil flap 154. The value $\delta\theta_{inf}$ is such that the positions of the foil flaps 152 and 154 remain at an angle of θ and that the two foil flaps 152 and 154 exert an interaction force between them which prevents them from separating in flight.

The same procedure is realized for the lower foil flap 154 by blocking it and applying a force to the upper foil flap 152 which tends to displace it by an angle $\theta-\delta\theta_{sup}$, in which $\delta\theta_{sup}$ is counted positively in the upwards direction of the upper foil flap 152. In other words, reducing the rotational angle in an anti-clockwise direction. It is therefore a question of controlling a rotation of the upper foil flap 152 which tends to reduce its angle in respect of the angle of the neutral position.

According to a particular embodiment, $\delta\theta_{inf}=\delta\theta_{sup}$.

FIG. 6 shows an example in which the crocodile-type flight control surface 150 exhibits an angle θ of −15° with respect to the horizontal. During flight, when the crocodile-type flight control surface 150 is instructed to adopt a particular position corresponding to an angle θ, the control unit instructs the first actuator 312 to apply to the upper foil flap 152 an angle $\theta-\delta\theta_{sup}$, in order to restrict it towards the bottom, and the second actuator 314, in order to apply to the lower foil flap 154 an angle $\theta+\delta\theta_{inf}$, in order to restrict it towards the top, which guarantees that the crocodile-type flight control surface 150 acts as one piece.

The fine-tuning and control of the crocodile-type flight control surface 150 have been more particularly described in the case of the actuating mechanism 210 comprising the two actuators 312 and 314 and the connecting rods 212 and 214, but they may be applied more generally in the framework of different actuating mechanisms 210.

Hence, while in flight, a control method of a crocodile-type flight control surface 150 comprises:
  a displacement stage during which the actuating mechanism 210 displaces the two foil flaps 152 and 154 into an angular position θ,
  when the foil flaps 152 and 154 have reached said angular position θ, an overload stage during which the actuating mechanism 210 applies to each foil flap 152, 154 a force corresponding to an angular deviation $\delta\theta_{inf}$, $\delta\theta_{sup}$ tending to bring them closer and previously evaluated during a fine-tuning stage.

The fine-tuning stage comprises:
  a clamping sub-stage during which a first foil flap 152, 154 is clamped in an angular reference position, an application sub-stage during which a force is applied to the second foil flap 154, 152, said force tending to press the second foil flap 154, 152 against the first foil flap 152, 154, an evaluation sub-stage during which the angular deviation $\delta\theta_{inf}$, $\delta\theta_{sup}$ of the second foil flap 154, 152 corresponding to the force thereby applied is evaluated, a clamping sub-stage during which the second foil flap 154,152 is clamped in the reference angular position, an application sub-stage during which a force is applied to the first foil flap 152, 154, said force tending to press the first foil flap 152, 154 against the second foil flap 154, 152, an evaluation sub-stage during which the angular deviation $\delta\theta_{inf}$, $\delta\theta_{sup}$ of the first foil flap 152, 154 corresponding to the force thereby applied is evaluated.

The first foil flap and the second foil flap may equally be the upper foil flap 152 or the lower foil flap 154.

Each $\delta\theta_{inf}$, $\delta\theta_{sup}$ is evaluated for the first time during the evaluation sub-stages by placing load transducers or strain gauges either on the plunger cylinders or on each foil flap and by measuring the angle corresponding to the force applied.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A crocodile-type flight control surface comprising:
   an upper foil flap,
   a lower foil flap,
   an actuating mechanism configured to guarantee the rotational displacement of each foil flap about a joint axis, either in the same direction or in different directions, wherein the actuating mechanism comprises:
      a first actuator,
      a second actuator,
      an upper connecting rod fixed at one end to the upper foil flap and at another end to the first actuator and
      a lower connecting rod fixed at one end to the lower foil flap and at another end to the second actuator,
      the upper connecting rod and the lower connecting rod being mounted in a rotationally movable manner about the shared axis, wherein one of the connecting rods comprises a first shaft, whereas the other connecting rod comprises a second shaft which is hollow and in which is housed said first shaft, and
   a locking mechanism alternatively adopting a locking position in which the upper foil flap and the lower foil flap are fixed, with respect to each other, and an unlocking position in which the upper foil flap and the lower foil flap are free, with respect to each other, wherein the locking mechanism comprises:
      a plunger cylinder, the cylinder extending the second shaft and a piston extending the first shaft, defining a chamber between the bottom of the cylinder and the piston,
      an energy source connected to the chamber and adapted to adopt, alternatively, a pressurized position in which the energy source puts the chamber under pressure and tends to push back the piston from the bottom of the chamber and an unpressurized position in which the energy source does not place the chamber under pressure,
      a return travel means which prevents the piston from moving towards the bottom of the chamber, and,
      wherein that part of the inner surface of the cylinder takes the shape of a first frustum and part of the outer surface of the piston takes the shape of a second frustum, the two frustums being arranged such that in an unpressurized position corresponding to the locking position, their lateral surfaces are in contact, preventing any movement with respect to the other, and such that in a pressurized position corresponding to the unlocking position, their lateral surfaces are not in contact, allowing movements of one with respect to the other.

2. An aircraft comprising:
   a structure; and
   at least one crocodile-type flight control surface according to claim 1 fixed to said structure.

3. A control method of a crocodile-type flight control surface according to claim 1, said control method comprising:
   displacing the two foil flaps in the same direction by the actuating mechanism into an angular position during a displacement stage,
   applying a force in an overload stage to each foil flap when the foil flaps have reached said angular position, corresponding to an angular deviation tending to bring the foil flaps closer and determined during a fine-tuning stage.

4. A control method of a crocodile-type flight control surface according to claim 1, said control method comprising:
   a fine-tuning stage comprising:
      clamping the upper foil flap in an angular reference position during a clamping sub-stage,
      applying a force to the lower foil flap during an application sub-stage, said forcing tending to press the lower foil flap against the upper foil flap,
      evaluating an angular deviation of the lower foil flap corresponding to the force thereby applied during an evaluation sub-stage,
      clamping the lower foil flap in the reference angular position during a clamping sub-stage,
      applying a force to the upper foil flap during an application sub-stage, said force tending to press the upper foil flap against the lower foil flap,
      evaluating the angular deviation of the first-upper foil flap corresponding to the force thereby applied during an evaluation sub-stage.

* * * * *